United States Patent [19]

Rhodes

[11] Patent Number: 5,372,091
[45] Date of Patent: Dec. 13, 1994

[54] FARROWING PIG PEN

[76] Inventor: Paul H. Rhodes, Holme House, Holme On Spalding Moor, York Y04 4HD, Humberside, United Kingdom

[21] Appl. No.: 73,908

[22] Filed: Jun. 9, 1993

[30] Foreign Application Priority Data

Jun. 12, 1992 [GB] United Kingdom ................. 9212567

[51] Int. Cl.⁵ ............................................. A01K 1/02
[52] U.S. Cl. ..................................................... 119/20
[58] Field of Search ............................... 119/16, 20, 27

[56] References Cited

U.S. PATENT DOCUMENTS

| | | | |
|---|---|---|---|
| 3,042,000 | 7/1962 | McMurray | 119/20 |
| 3,181,503 | 5/1965 | Tripp | 119/20 |
| 3,237,600 | 3/1966 | Behrens et al. | 119/20 |
| 4,428,324 | 1/1984 | Salminen | 119/20 |

*Primary Examiner*—Gene Mancene
*Assistant Examiner*—Thomas Price
*Attorney, Agent, or Firm*—William A. Drucker

[57] ABSTRACT

The invention relates to a pig farrowing pen and resides in directing air flows under the sow when standing to drive the piglets to a safe location and thereby prevent the piglets from being trapped and crushed as the sow moves from an elevated position to a lying position.

In one described embodiment an element (18) lies in the path of the sow as she rises and the element (18) is elevated as the sow moves to an elevated position. The element (18) carries an electrical switch (20), conveniently a tilt switch, which is closed as the element (18) is elevated by the sow and, on the switch (20) closing, a valve (24) is opened to direct pressure air flows under the sow. As the sow moves from an upright posit on towards a lying position the element (18) is lowered, the electrical switch (20) opens and the supply of pressure air is terminated.

In preferred embodiments the air supply may be pulsed and/or chilled to encourage the piglets to move from the danger zone beneath the sow.

22 Claims, 1 Drawing Sheet

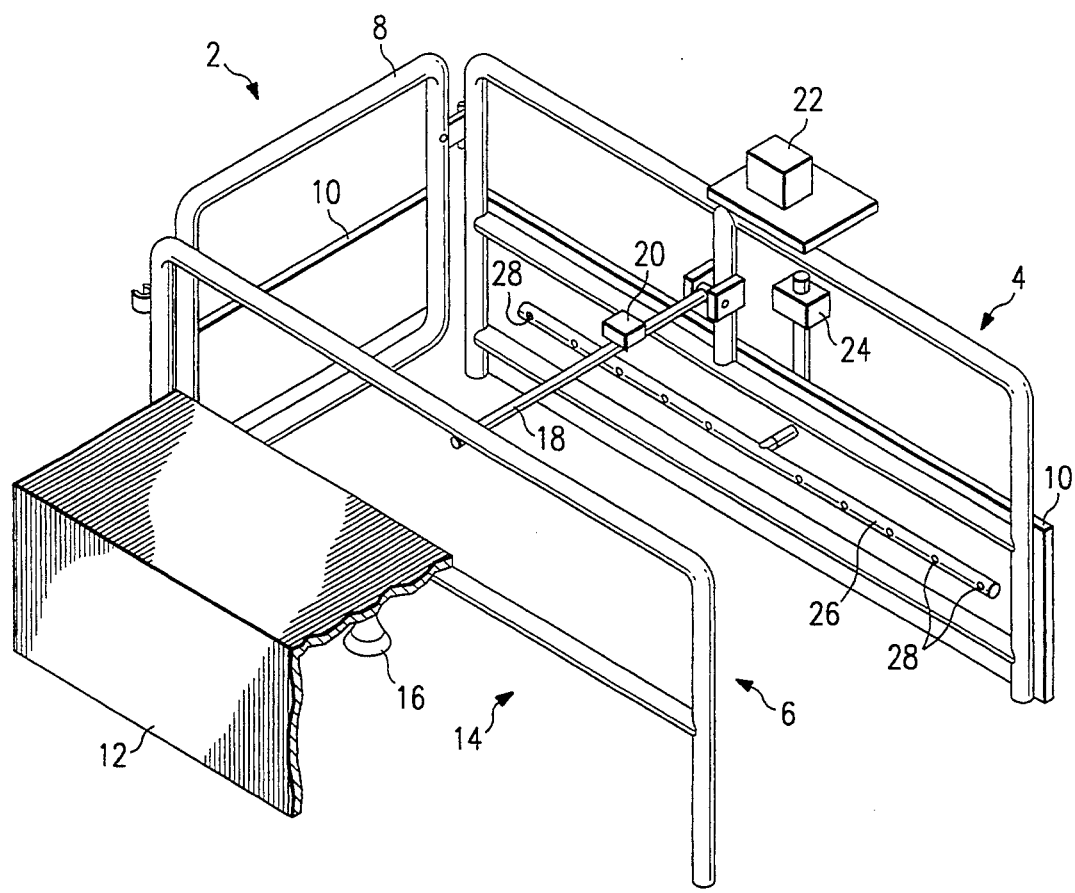

FARROWING PIG PEN

BACKGROUND OF THE INVENTION

1. Field of the Invention

This invention relates to a farrowing pig pen.

Pig pens conventionally comprise an enclosure for the pig, defined by two generally parallel side walls, a back wall, and a front gate through which access can be gained to the pen. Such pens can be made from tubular elements, especially galvanised steel tubes. Pig pens are commonly adapted for use by sows when they are farrowing, to accommodate the sow and to allow her piglets access to be able to suckle.

A pig pen which is intended for use by a sow when farrowing can have one of the side walls, the back wall and the gate bearded up to retain the piglets in the pen. A retreat can be conveniently fitted to the other of the side walls, which might have a generally box-like form open along one side to allow the piglets access to the sow in the enclosure. A retreat in the form of a box is being often referred to as a "piglet creep". The retreat can be fitted with a source of heat for the piglets within it, for example in the form of heating lamps, which can attract the piglets into the retreat after they have finished feeding from the sow.

The pen is generally constructed so that movement of the sow within it is somewhat restricted in the enclosure, forwards and backwards as well as side to side, while allowing the sow to move between standing and lying positions. The piglets will suckle from the sow when she is in a lying position. The sow moves from a standing position to a lying position either by sliding against one side wall of the enclosure, or by collapsing her legs and rolling to a lying position. Whichever technique is used by the sow, there is a significant risk that one or more piglets will be trapped beneath the sow, and be crushed or smothered by her as she lies down. It has been found that there is a significant mortality rate among piglets as a result of accidents of this kind.

2. Brief Description of the Prior Art

In British Patent Publication No 2117620A there is disclosed one arrangement for overcoming this problem, an electro-optical sensor arrangement, such as an infra-red transmitter and receiver, is arranged such that on standing the sow breaks the light beam to initiate a blower which blows air beneath the sow to drive the piglets into the piglet creep and, on the the sow lying down, the light beam circuit is completed, and the blower is switched off. However, in practise, in the humid, dusty and frequently heavily contaminated environment the infra-red transmitter and/or receiver can be obscured, rendering the device inoperable with air continuously blowing, and such devices have never been popular.

Further, the arrangement proposed in GB Patent Application No 2117620 teaches operation of the arrangement only when the sow is standing. However, when the sensor is set to detect a sow in the standing position, said sensor will not detect a sow in a partially upright position, e.g. sitting on her haunches, and with the sow in a sitting position with the arrangement not actuated, to blow air under the sow, the piglets are in danger when the sow lowers to her lying position.

SUMMARY OF THE INVENTION

In this specification the term "elevated" means that the sow is standing erect or partially erect, as when sitting on her haunches, or is otherwise "elevated" from her fully reclined position.

The present invention provides a technique for causing piglets to move from beneath the sow, when the sow is elevated as hereinbefore defined, which involves exposing the region of a pen beneath a sow to pressurized, to cause the piglets to move into an adjacent retreat.

Accordingly, in one aspect, the invention provides a farrowing pig pen which comprises an enclosure for a sow, a retreat area connected to the enclosure to which piglets can retreat from the enclosure, and at least one nozzle which can be connected to a source of pressurized air, and from which pressure air can be directed into the enclosure to drive piglets from the enclosure into the said retreat area and means for sensing when the sow is in an elevated position, the sensing means being connected to means for controlling the flow of pressurized air, by which the said flow is initiated when the sow moves towards and into an elevated position.

In another aspect, the invention provides a method of discouraging piglets from standing beneath a farrowing sow, which comprised the steps of directing pressurized air into the region below the sow when the sow is elevated, as herein defined.

It has been found that the exposure of the region of the enclosure below the sow to pressurized air can be sufficient to encourage piglets in that region to move, so that they will not then be crushed or smothered by the sow when she moves from an elevated position in the enclosure to a lying position. Movement of the piglets into the retreat can be encouraged further by providing a source of heat for the piglets in the retreat area.

The flow of pressurized air, which may be provided by a fan means or from a compressed air source will preferably be directed across the enclosure in a single direction. That direction may be towards the retreat, and this has been found to be particularly effective in encouraging the piglets to move away from the enclosure into the retreat.

Preferably, the pen includes positive means for sensing when the sow is in an elevated position, the sensing means being connected to means for controlling the flow of pressurized air, by which the said flow can be reduced or terminated when the sow is not in an elevated position. In this way, the piglets can be encouraged to move out of the retreat to suckle from the sow, when the sow is no longer in an elevated position. Furthermore, the amount of pressurized air which is used in the pen is reduced, so as to reduce wastage.

The sensing means will generally have two states, corresponding to when the sow is in her elevated and lying positions respectively. These states might for example correspond to the open and closed positions of an electrical switch, the open and closed positions corresponding to either of the standing and lying positions. In another example, the states of sensing means might correspond to the two states of a light source and photoelectric cell assembly in which light can pass, and is blocked from passing, respectively between the light source and the cell.

It is preferred that the sensing means comprise an element which is contacted by the sow as she moves from a lying position to an elevated position, and an electrical switch which is moved between its open and closed positions when the sow contacts the said element. The element can conveniently be provided by a bar which is able to pivot about a horizontal axis when contacted by the sow as she moves into an elevated position. This arrangement has the advantage of being simple, and can be relatively insensitive to maltreatment.

Preferably said element is located to engage the forward regions of the sow, for example the shoulder region, so as to be positively displaced by the sow moving into a sitting position.

One example of another type of sensing means comprises a light source on one side of the enclosure and a photoelectric cell on the other side of the enclosure, at such a height that the beam of light between the source and the cell is broken when the sow moves from a lying position to an elevated position.

The switch of the sensing means can move between open and closed positions, for example, by movement of a contact between two position. However, when the sensing means comprises an element which moves when contacted by the sow, it can be convenient for a switch in the form of a tilt switch to be mounted on the element, so that movement of the element causes the switch to move between open and closed states directly.

The means for controlling the flow of pressurized air preferably comprises a valve. The valve may be controlled by means of electronic control equipment, for example through a solenoid.

Preferably, a nozzle is provided in the form of an opening in a conduit through which the pressurized air flows. It is preferred that the pen of the invention includes an array of nozzles, spaced apart along the enclosure.

In a preferred embodiment the flow of air may be varied, whereby when the sow is in an elevated position the air is delivered at a first rate and when the sow begins to lie down the air flow is at a greater rate, thereby discouraging hungry piglets from braving the basic air flows whilst the sow is moving to a lying position. Thus, according to one embodiment, when the sensor is a mechanical element displaced by the sow the lowering of the element in the first stage of the sow moving to a lying position increases the delivery of air from the nozzle and/or opens a secondary air supply, which supplements the basic air flow beneath the sow.

The secondary air flows may be terminated as the positive sensor moves to its lowermost position or said secondary air flows may terminate a predetermined time after the said secondary air flows are initiated.

Thus, with the embodiment described thus far, a flow of air beneath the sow discourages the piglets from leaving the piglet creep whilst the sow is elevated. However, with the prior art proposed arrangements and the above embodiment, it is possible for the sow when lying down to obstruct the air flows from the nozzles, whereupon the hungry piglets may move out of the piglet creep and beneath the sow as the sow is lying down, whereupon the piglets are in danger.

To overcome this problem, the pig pen preferably includes means by which the flow of air through the nozzle(s) can be pulsed. This has been found to be particularly effective in encouraging piglets to move into the retreat. The pulsed flow of the air can be controlled by means of appropriate electronic control equipment, which might for example control a solenoid operated valve, to cause the valve to open and to close periodically, at least partially, as required.

In another embodiment, the air which is supplied to the pen, and most preferably the secondary air supply when provided, is chilled to a temperature which is below the ambient temperature in the pen. For example, the air may be chilled to a temperature which is at least 5 degrees C., preferably at least about 10 degrees C., and more preferably at least about 15 degrees C. below the ambient temperature. Chilling the air in this way has been found to be particularly effective in encouraging piglets to move into the retreat.

In another embodiment the pressurized air arrangement or the supplementary air arrangement, when provided, may include means for generating a substantially upright curtain of air across the entrance to the piglet creep to discourage the piglets from leaving the creep until the sow is in a lying position.

BRIEF DESCRIPTION OF THE DRAWING

The drawing is an isometric view of a pig pen in accordance with the present invention.

DESCRIPTION OF THE PREFERRED EMBODIMENT

Embodiments of the present invention will now be described, by way of example, with reference to the accompanying drawings, which is an isometric view of a pig pen in accordance with the invention.

Referring to the drawing, a pig pen 2 comprises an enclosure for the pig, defined by two generally parallel side walls 4, 6, a front gate 8 through which access can be gained to the pen, and a back wall (not shown). The side walls 4, 6, the gate and the back wall of the enclosure for the sow are formed from galvanised steel tubes.

The pig pen when intended for use by a sow when farrowing includes boards 10 along one of its side walls 4, the back wall and the gate, in order to retain the piglets in the pen. A retreat 12 for piglets is fitted to the other of the side walls 6, and has a generally box-like construction, which is open along one side 14 for access to the sow in the enclosure. A heating lamp 16 is provided in the retreat.

A bar 18 extends approximately horizontally across the enclosure, being mounted on the side wall 6 which is opposite to the retreat 12 for pivotal movement about a horizontal axis. The bar 18 is mounted at such a height that it is able to pivot upwardly from a position in which it rests on the sow when the sow is in a lying position or the bar 18 may be supported slightly above the sow when she is in a lying position. In this way, the bar 18 is made to pivot upwardly when the sow moves from a lying position to an elevated position.

A mercury tilt switch 20 is connected to the bar 18, and arranged to close when the bar 18 moves between its lowered position (which it occupies when the sow is lying down) to a raised position (which it occupies when the sow is elevated).

The switch 20 forms part of control circuit 22, by which the flow of pressurized air to the enclosure is controlled. The circuit generates signals which are passed to a solenoid valve 24, which controls the flow of air from an appropriate source to the enclosure. In a preferred embodiment, the control circuit generates signals which cause the flow of air to be pulsed.

A tube 26 is provided along the side wall 6, which is opposite to the retreat 12, and the tube 26 has a plurality of nozzle openings 28 formed in it, through which pressurized air flowing in the tube can be directed into the enclosure. The tube 26 is connected to a source of pressurized air (not shown) such as a fan compressor or an air cylinder, by means of appropriate conduits. The valve 24 controls the flow of pressurized air into the tube 26.

In another embodiment (not shown) the arrangement may include cooling means for cooling the pressurized air before delivery to the enclosure and preferably the air is chilled to a temperature of at least 5 degrees C., more preferably at least 10 degrees C. and most preferably at least 15 degrees C. below the ambient temperature in the enclosure.

In a further modification the bar 18 may include two tilt switches, the switch 20 for controlling the release of pressurized air defined above and the second switch being arranged to release a secondary air supply into the enclosure, in a direction to encourage the piglets to move into the retreat, whilst the bar 18 is lowered as the sow moves towards a lying position. Thus, the air encouraging the piglets to enter, or remain, in the retreat is increased for the danger period whilst the sow is moving to a lying position.

The secondary air supply arrangement may be terminated by the tilt switch opening as the sow lowers herself or said supplementary supply arrangement may include a timer arrangement to terminate the secondary air supply after a predetermined time interval.

In another embodiment (not shown) a second tube, similar to the tube 20 with nozzles spaced therealong, is arranged along the entrance to the piglet creep, above or below the entrance, and the nozzles are directed to generate a curtain of pressurized air over the entrance to the creep to discourage the piglets from leaving the creep whilst the sow is in an elevated position.

I claim:

1. A farrowing pig pen, comprising an enclosure for a sow, a retreat area open to the enclosure and into which piglets are free to retreat from the enclosure, sensing means arranged to be displaced by the sow as the sow rises towards an elevated position, a nozzle, control means for connecting and disconnecting said nozzle to a pressurized air source, said control means being operatively connected to said sensing means and arranged to open, to release pressurized air from said nozzle, as the sow rises and to disconnect the pressurized air supply from said nozzle as the sow moves towards a lying position, and wherein said nozzle is arranged to direct pressurized air released therefrom into the enclosure to encourage piglets to leave the enclosure and enter into said retreat area.

2. A farrowing pig pen according to claim 1, characterised in that said sensing means comprise an element which is contacted and elevated by the sow when moving from a lying position to an elevated position, and is lowered as the sow moves from an elevated position towards a lying position.

3. A farrowing pig pen according to claim 1, characterised in that said control means include an electrical switch which is moved from its open position to its closed position as the sow rises from a lying position and is moved from its closed position to its open position as the sow approaches a lying position.

4. A farrowing pig pen according to claim 1, characterised in that said control means includes an electrical switch which is moved from its open position to its closed position as sow moves from her lying position and is moved from its closed position to its open position as the sow approaches a lying position, the said switch comprising a tilt switch.

5. A farrowing pig pen according to claim 1, characterised in that said control means includes an electrical switch which is moved from its open position to its closed position as the sow moves from her lying position and is moved from its closed position to its open position as the sow approaches a lying position and wherein the said electrical switch is connected to a valve means for controlling the flow of pressurized air into the enclosure.

6. A farrowing pig pen according to claim 1, characterised by a source of heat in the retreat area.

7. A farrowing pig pen according to claim 1, characterised in that the retreat area is defined by a box-like construction, with an opening along one side for access to the enclosure.

8. A farrowing pig pen comprising an enclosure for a sow, a retreat area open to the enclosure and into which piglets are free to retreat from the enclosure, sensing means arranged to be displaced by the sow as the sow moves from her lying position towards an elevated position, a plurality of nozzles, control means for connecting and disconnecting said nozzles to a pressurized air source, said control means being operatively connected to said sensing means and arranged to open, to release pressurized air from said nozzles, as the sow moves from her lying position and to disconnect the pressurized air supply from said nozzles as the sow approaches a lying position, and wherein said nozzles are arranged to direct pressurized air released therefrom into the enclosure to encourage piglets to leave the enclosure and enter into said retreat area.

9. A farrowing pig pen according to claim 8, characterised in that said nozzles are spaced apart along the enclosure and arranged to direct pressurized air beneath the sow whilst the sow is in an elevated position.

10. A farrowing pig pen according to claim 8, and wherein the pressurized air supply is pulsed.

11. A farrowing pig pen accordingly to claim 8, and wherein the pressurized air supply is chilled.

12. A farrowing pig pen, comprising an enclosure for a sow, a retreat area open to the enclosure and into which piglets are free to retreat from the enclosure, sensing means arranged to be displaced from a rest position by the sow as the sow moves from her lying position towards a standing position, a nozzle, first control means for connecting and disconnecting said nozzle to a pressurized air source, said first control means being operatively connected to said sensing means and arranged to open, to release pressurized air from said nozzle, as the sow rises from her lying position, whilst the sow is in an elevated position and whilst the sow is approaching a lying position, and to disconnect the pressurized air supply from said nozzle as the sow settles towards a lying position, a secondary pressurized air supply arranged to release pressurized air into the enclosure whilst the sow is moving from the elevated position towards the lying position, and to terminate the supply of secondary pressurized air as the sow approaches its lying position, and wherein said nozzle is arranged to direct pressurized air released therefrom into the enclosure to encourage piglets to leave the enclosure and enter into said retreat area.

13. A farrowing pig pen according to claim 12, and wherein the secondary air supply is supplied to the enclosure via said nozzle.

14. A farrowing pig pen according to claim 12, and wherein said pressurized air supply and said secondary air supply are released into the enclosure via a plurality of nozzles.

15. A farrowing pig pen according to claim 12, and wherein the pressurized air supply is pulsed.

16. A farrowing pig pen according to claim 12, and wherein the said secondary air supply is pulsed.

17. A farrowing pig pen according to claim 12, and wherein said pressurized air supply is chilled.

18. A farrowing pig pen according to claim 12, and wherein said secondary air supply is chilled.

19. A method for discouraging piglets from standing beneath a farrowing sow, characterised by the step of directing pressurized air into a region below the sow.

20. A method according to claim 19 including the steps of directing a primary pressurized air into the region below the sow whilst the sow is in an elevated position and directing a secondary air supply into time region below the sow whilst the sow is moving from an elevated position towards a lying position, the primary pressurized air being terminated when the sow is in a lying position and the secondary air supply being terminated after said supply has been actuated for a predetermined time to allow the sow to adopt a fully reclined position.

21. A method according to claim 19, characterised by the steps of pulsing the air directed into the region below the sow.

22. A method according to claim 19, characterised by the steps of chilling the air directed below the sow.

* * * * *